United States Patent [19]
Downer et al.

[11] Patent Number: 5,557,409
[45] Date of Patent: Sep. 17, 1996

[54] CHARACTERIZATION OF AN EXTERNAL SILICON INTERFACE USING OPTICAL SECOND HARMONIC GENERATION

[75] Inventors: Michael Downer; Jerry I. Dadap, both of Austin; John K. Lowell, Round Rock, all of Tex.

[73] Assignee: Advanced Micro Devices Inc., Sunnyvale, Calif.

[21] Appl. No.: 322,324

[22] Filed: Oct. 13, 1994

[51] Int. Cl.⁶ .................................................. G01B 11/30
[52] U.S. Cl. ........................................................ 356/371
[58] Field of Search ............................................ 356/371

[56] References Cited

U.S. PATENT DOCUMENTS 5,294,289  3/1994  Heinz et al. ............................ 156/626
5,296,960  3/1994  Ellingson et al. ...................... 359/330

*Primary Examiner*—F. L. Evans
*Attorney, Agent, or Firm*—Foley & Lardner

[57] ABSTRACT

A non-destructive, non-intrusive characterization of angstrom-level roughness characteristics of subsurface interfaces is performed by applying femtosecond light pulses from a laser onto a surface, and analyzing the contents of the reflected pulses. After impinging on the surface being analyzed, the pulses pass through optical filters, which attenuate the fundamental and third harmonic frequencies of the pulses, but keep a substantial portion of the second harmonic. Analysis of the second harmonic signals provides rapid, non-contact, interface-specific characterization of the angstrom-level interfacial microroughness of the subsurface. For semiconductor devices, the second harmonic signals can be used to detect strain, contamination, and trapped charges in the Si/Si(O₂) interface.

40 Claims, 9 Drawing Sheets

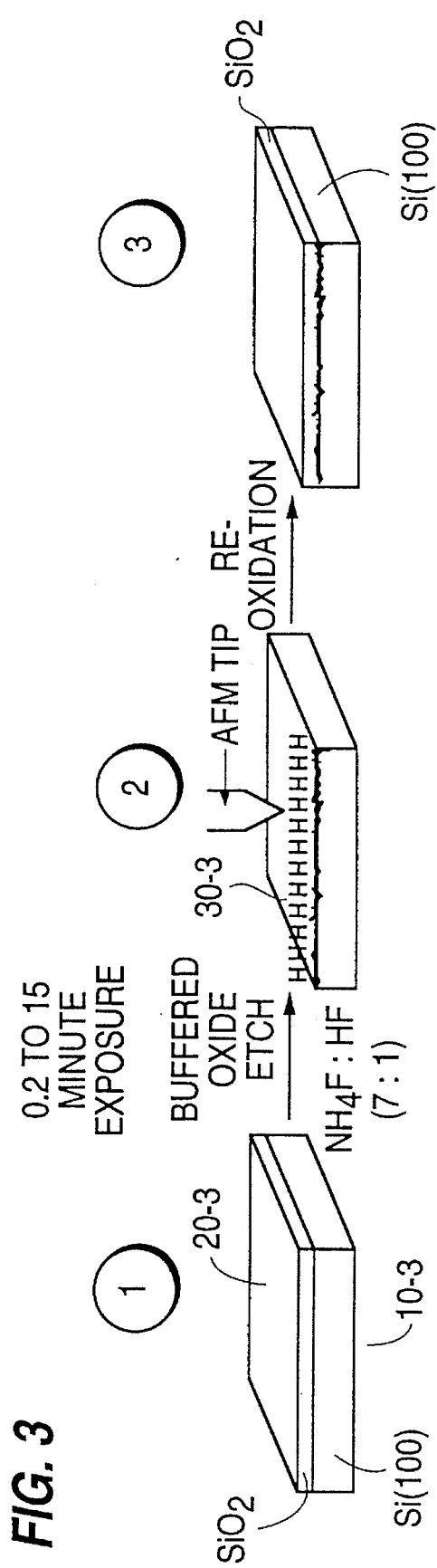

FIG. 4b
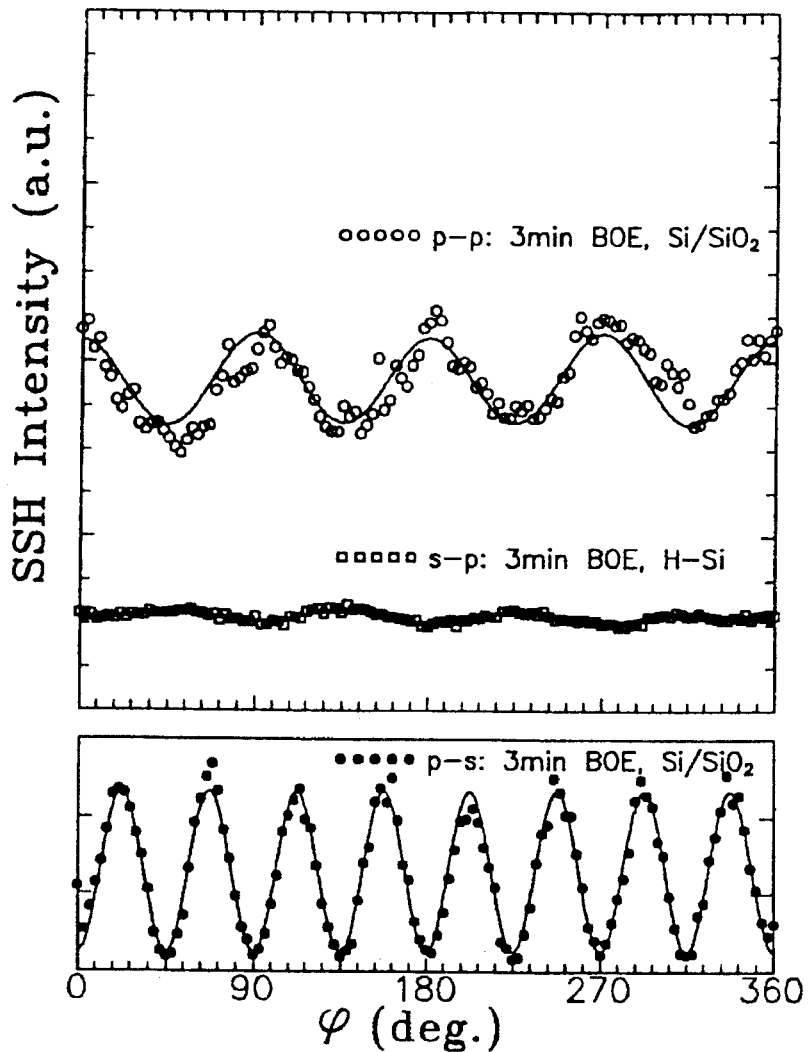
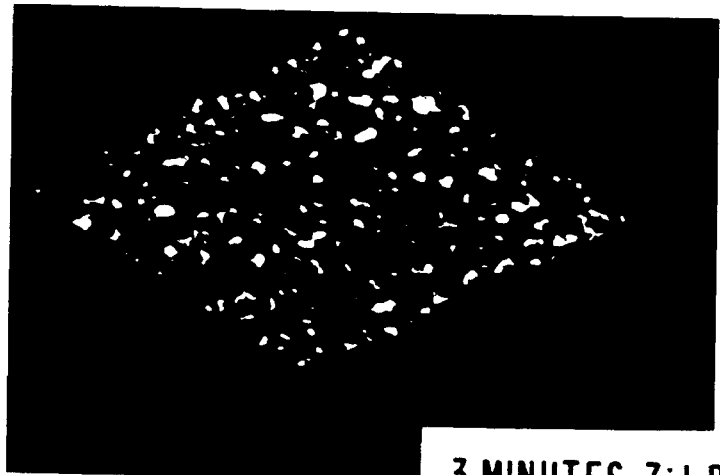
3 MINUTES 7:1 BOE

FIG. 4c
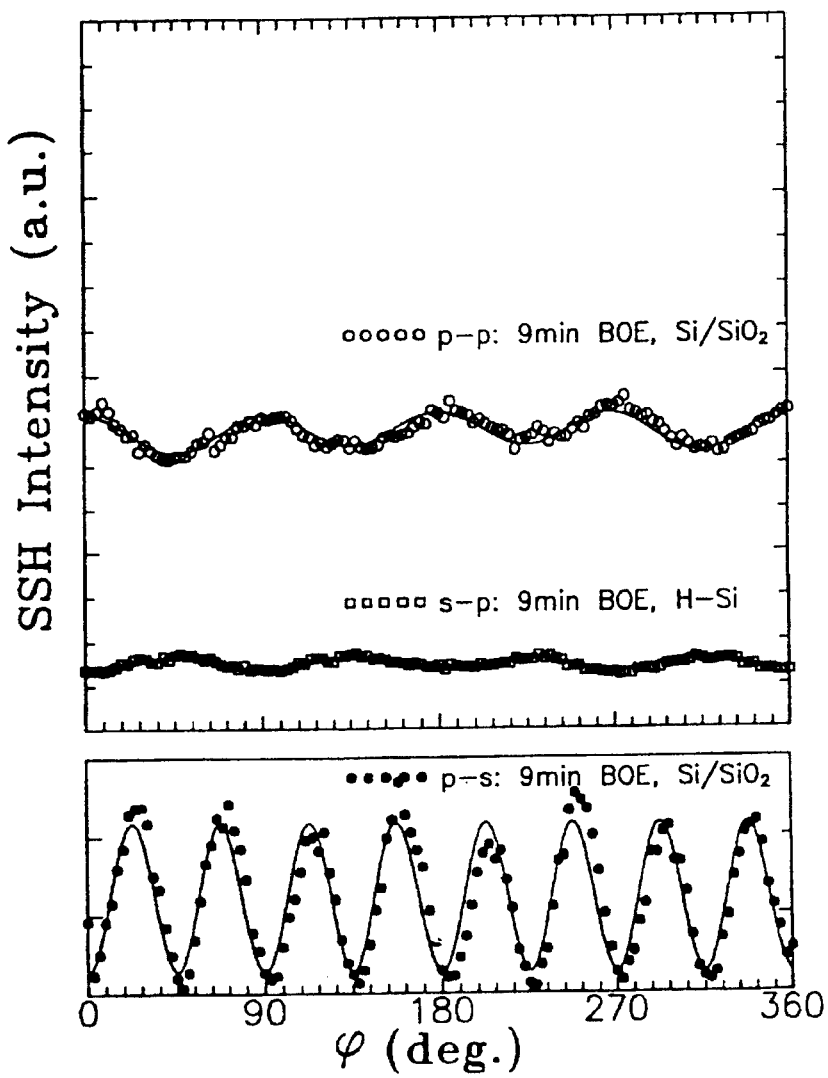
9 MINUTES 7:1 BOE

CHARACTERIZATION OF AN EXTERNAL SILICON INTERFACE USING OPTICAL SECOND HARMONIC GENERATION

BACKGROUND OF THE INVENTION

1. Field of the Invention

The invention relates to measurement of physical properties of surfaces, in particular semiconductor surfaces, using non-destructive, non-intrusive analytic techniques. In particular, the non-destructive techniques involve the use of second harmonic generation by reflecting femtosecond laser pulses from a surface to be studied.

2. Description of the Related Art

Current trends in the silicon microelectronics industry are driving metal-oxide semiconductor (MOS) devices to deep sub-micron dimensions, and corresponding gate oxide layers are being driven to sub-50 Angstrom (Å) thicknesses, thereby tightening the requirements for the control of silicon/silicon dioxide [$Si(100)/SiO_2$] interfacial contamination and microroughness during device processing. FIGS. 1a and 1b illustrate representative dimensions used in current semiconductor devices and the dimensions expected in the semiconductor devices of the next decade, respectively.

Certain cleaning chemistries that are used on semiconductor devices can roughen the silicon surface. This roughening, even at the Å level, can result in poor reliability for MOS devices. At present, few analytical techniques exist for measuring Angstrom-scale interface roughness in situ, without removing the oxide layer. Optical techniques are attractive for this purpose since they are non-destructive, non-intrusive, and can measure roughness at the $Si(100)/SiO_2$ boundary through the thick transparent $SiO_2$ layer. However, linear optical techniques, such as light scattering, as described by J. Bennett and L. Mattson, in *Introduction to Surface Roughness and Scattering* (Optical Society of America, Washington, D.C., 1989), probe the entire optical absorption depth and thus possess limited sensitivity to a specific buried interface of interest.

Optical surface second harmonic generation (SHG), on the other hand, can be an interface-specific probe for centrosymmetric semiconductors, since in the electric dipole approximation of such devices, even-order nonlinear susceptibilities are nonvanishing only at interfaces, where bulk inversion symmetry is broken. For example, in $Si(100)/SiO_2$ structures, the electric dipole susceptibility of only a few atomic monolayers at the interface generates p-polarized (or parallel-polarized) second harmonic signals. Simultaneously, the bulk quadrupole susceptibility throughout an absorption depth of the material generates much weaker s-polarized (or perpendicular-polarized) second harmonic signals.

Previous studies of optical surface second harmonic generation of centrosymmetric semiconductors have used highly amplified laser pulses of nanosecond (ns) or picosecond (ps) duration in order to achieve observable second harmonic yields. These methods have been described by Y. Shen, in *Principles of Nonlinear Optics* (John Wiley and Sons, 1984). These approaches suffer in their measurement capabilities due to low repetition rate (around 10 Hz), limited signal-to-noise ratio, long acquisition times, as well as significant heating of the sample being measured, whereby the heating may even cause damage to the semiconductor device being measured.

In light of the above problems with the current techniques, it is desirable to come up with a technique for measuring the roughness of internal layers of semiconductor devices using non-destructive and non-intrusive methods, and also doing so with a better measurement capability than what is currently available.

SUMMARY OF THE INVENTION

It is therefore an object of the invention to provide a second harmonic light generated at a centrosymmetric semiconductor interface more efficiently by using light pulses from solid-state femtosecond lasers. With this improvement, sensitive, non-destructive, and rapid diagnostics of this critical semiconductor interface can be performed, and thereby ensure reliable gate oxide fabrication for the next generation of MOS devices, which will demand much tighter restrictions on interfacial microroughness and contamination levels. The high sensitivity and data acquisition speed advantages of the invention make it appropriate for developing an optical monitoring device that can be used as an in situ diagnostic on industrial fabrication lines.

In accordance with this object, there is a method of determining physical properties of a surface to be studied, comprising the steps of: a) applying a plurality of light pulses from a laser light source to the surface, where each pulse has a width in the femtosecond range, b) detecting a second harmonic in a light signal reflected from the surface, and c) identifying variations in the physical properties of the surface from changes in characteristics of the second harmonic.

In accordance with this object, there is another method of determining physical properties of a surface to be studied, comprising the steps of: 1) applying a plurality of light pulses to the surface from a Ti:Sapphire laser source, where each pulses has a width of about 120 femtoseconds, 2) receiving light pulses reflected from the surface into optical filters, where the optical filters block a substantial amount of the fundamental and third harmonic frequency of the light pulses and pass a detectable portion of the second harmonic frequency of the light pulses reflected from the surface, and 3) receiving the second harmonic into an analyzer, where the analyzer detects variations in the second harmonic and where variations in the second harmonic can be related to physical properties of the surface, for example, by the analyzer or some other processor.

In each case, an average of the second harmonic components for each light signal within a predetermined time can be used. In addition, for a surface such as a semiconductor wafer, points on the surface can be scanned. An average can be taken at each location and the surface, such as the wafer, can be changed in relative position. The peak power and repetition rate of the laser light source are controlled to limit heating of the surface. The physical and chemical properties of the material can then be characterized without destroying the surface.

Other objects, features, and advantages of the invention will be apparent to those of ordinary skill in the art from the following more detailed description.

BRIEF DESCRIPTION OF THE DRAWINGS

Exemplary embodiments of the invention are shown in the drawings, in which:

FIG. 3 gives a pictorial listing of the steps in the process for preparing wafers for buffered oxide etch (BOE) treatment in further preparation for SHG measurement of those wafers;

FIGS. 4a–4c show representative anisotropic second harmonic data for various polarization configurations;

FIG. 8 shows an equation used in the optimization of various parameters for SHG.

DETAILED DESCRIPTION OF THE PREFERRED EMBODIMENT

Modulation of depletion- (or inverse depletion-) type surface electric fields by chopped photoexcitation of excess minority carriers produces a corresponding modulation, or a photomodulation, of the surface voltage barrier and the linear optical properties of the depletion region. These two effects underlie surface photovoltage (SPV) and modulation spectroscopy measurements, respectively, which in turn can be used as non-contact diagnostics of trapped surface or interface charge and metallic contamination. SHG experiments performed on ZnSe and GaAs semiconductor wafers have shown that photomodulation is strongly influenced by the nonlinear optical properties of the depletion region of these substrates.

Other experiments have shown a second harmonic signal dependence of $Si(100)/SiO_2$ based on the doping level of a substrate, suggesting a similar sensitivity to surface band bending. The unprecedented high repetition rate SHG signals which can now be obtained from silicon using a Ti:sapphire femtosecond laser allow for lock-in detection of the SHG signal. It has been observed that there is a strong dependence of SHG from silicon on various types of subsurface gradients; e.g., from thermoelastic interface stress and implant doping, which break local inversion symmetry and thus strongly enhance second harmonic signal generation. Thus, the high sensitivity detection method which is the hallmark of SPV and modulation spectroscopy can now be adapted to monitoring a surface nonlinear optical signal.

In a system according to the invention, obtaining angstrom-scale sensitivity is achieved by employing an unamplified, solid-state femtosecond laser which provides light pulses of high peak power (100 kW or greater) and high repetition rate (100 MHz or greater) in order to optimize second harmonic generation and data collection efficiency, and thereby also resulting in low energy output ($<10^{-8}$ Joules) to limit the unwanted heating (<5 deg K) of the sample being analyzed.

Figure 1A:
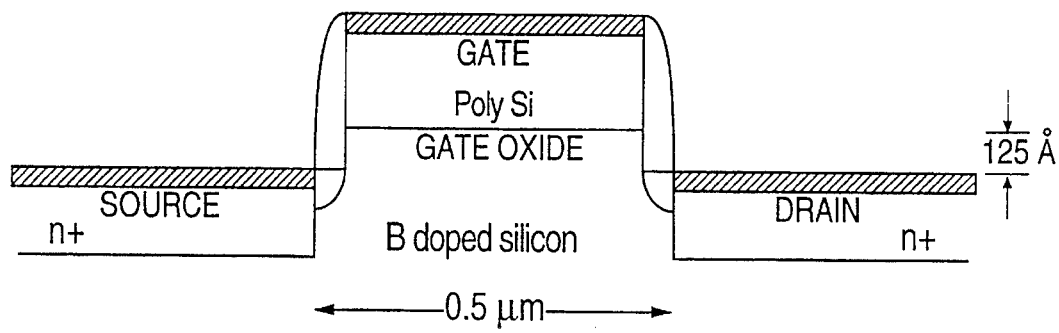
FIG. 1a illustrates representative dimensions used in current semiconductor devices.
Figure 1B:
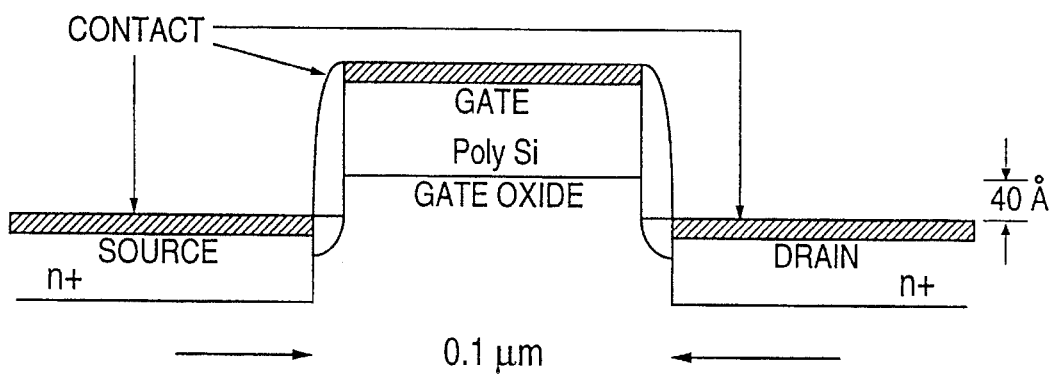
FIG. 1b illustrates representative dimensions likely to be used in the next generation semiconductor devices.
Figure 2:
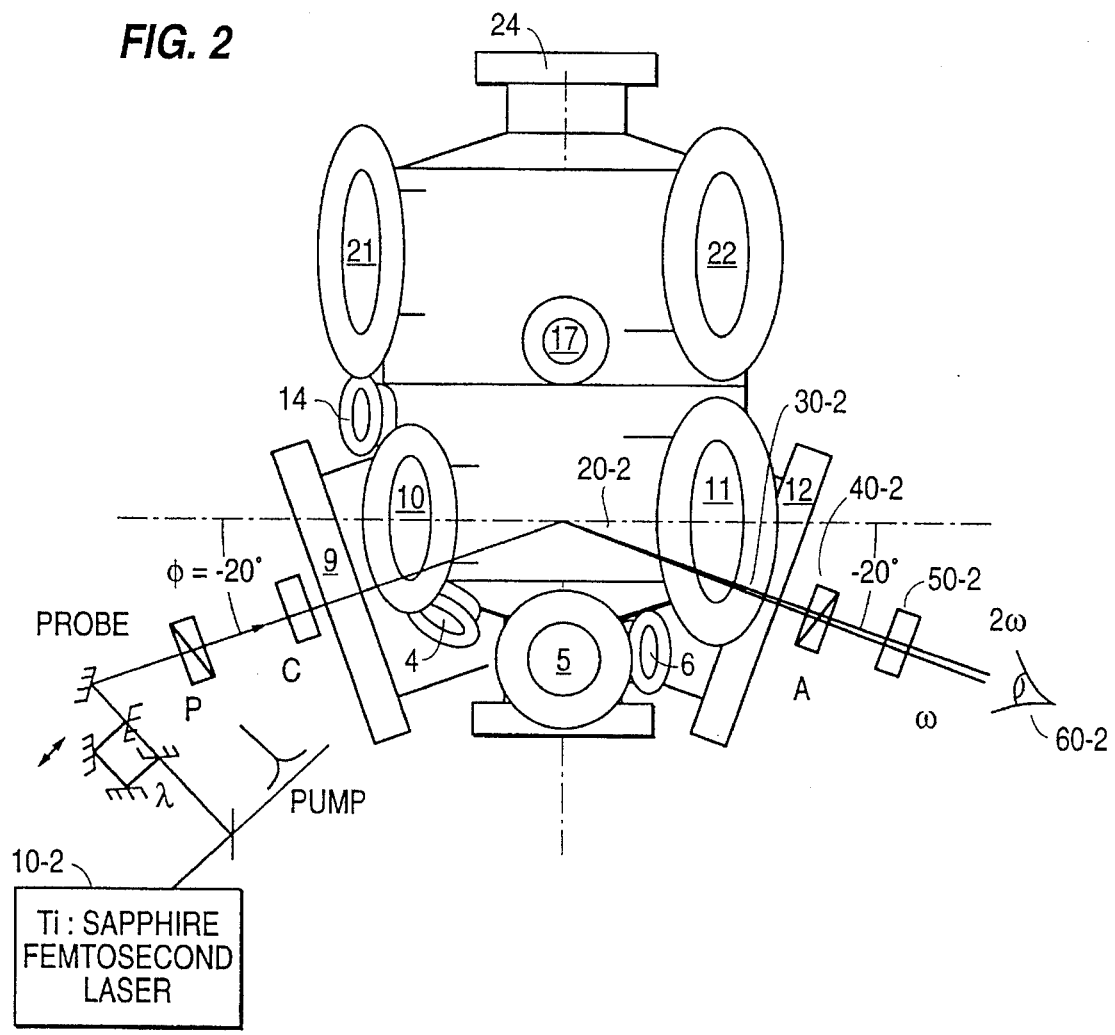
FIG. 2 diagrams the components used to measure angstrom-level microroughness according to one embodiment of the invention.

FIG. 2 shows the components used in one embodiment of the invention. In this embodiment, a plurality of 120 femtosecond pulsewidth, 800 nm wavelength, p- and s-polarized pulses from a Ti:Sapphire laser 10-2 are reflected onto a Si(100) sample 20-2 at a 45 deg. incident angle with a beam waist of around 40 μm. The reflected beam 30-2 then passes through a polarization analyzer 40-2 and a series of optical filters 50-2 which block both the fundamental and the third harmonic, but transmit a significant percentage of the second harmonic (i.e., at least 50%). The reflected second harmonic signal is then detected by a photon counter 60-2 via a photomultiplier tube as the sample is slowly rotated 360 degrees around the surface normal. A small part of the pump beam is split off to generate second harmonic signals from a quartz plate (not shown) to serve as a reference signal against drifts in the average laser power or pulse duration during data acquisition.

Test results of the first embodiment show that the typical counting rate from p-polarized emission is around 100 kHz and the typical counting rate for s-polarized emission is around 500 Hz. The typical dark count rate is around 3 Hz. The signal averaging time used for p-polarized emissions was 0.2 seconds per data point, thereby allowing a complete high resolution scan of rotational anisotropy within only about 1 minute of data acquisition time.

Referring now to FIG. 3, in another test, samples were cut from a p-polarized Si(100) wafer 10-3 with a native oxide layer 20-3. The oxide was then removed, and the surface hydrogen-terminated and controllably roughened by dipping the sample pieces in a high purity 7:1 $NH_4F$:HF buffered oxide etching (BOE), with a pH of 6.2, for time periods ranging from 10 seconds to 13 minutes. The resulting hydrogen-termination (h-termination) 30-3 on the wafer makes it very stable in air. The samples were then rinsed in distilled water for about 10 seconds, and were reproducibly hydrophobic, indicating oxide removal. Immediately after each sample preparation, second harmonic data was taken in air using all possible polarization configurations.

Figure 4A:
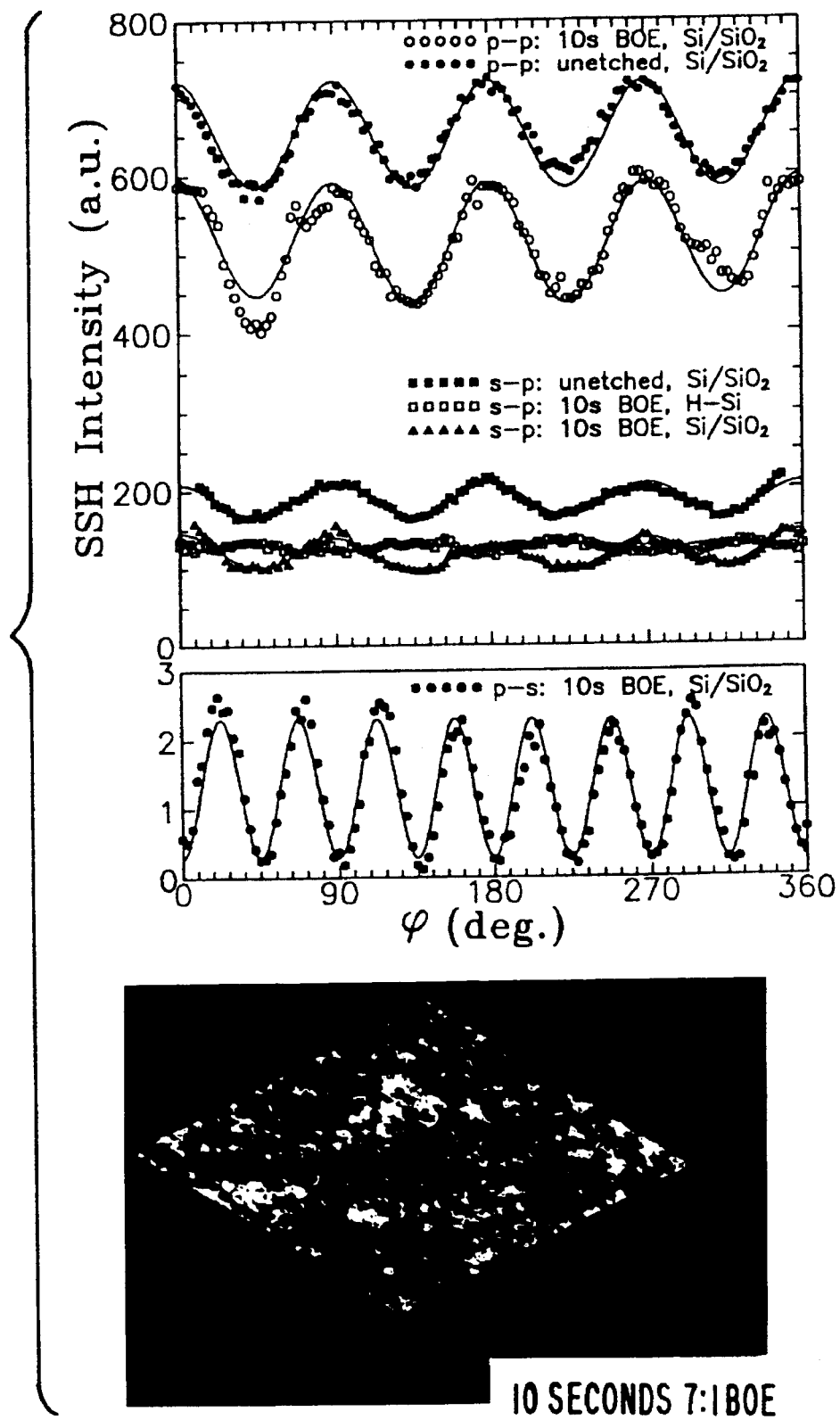

FIGS. 4a–4c show representative rotationally anisotropic second harmonic data, where $\phi$ is the angle between the plane of incidence and the Si(001) crystalline axis. For reference, data for the unetched (native-oxidized) sample are shown in FIG. 4a for the p-p (p-polarized fundamental, p-polarized second harmonic; filled circles) and s-p (filled squares) configurations. This data shows the well known four-fold symmetric pattern with the first maximum $\phi=0$ deg., characteristic of the smooth Si(100) surface. The open squares show second harmonic data for the s-p configuration immediately following BOE treatment for times of (a) 10 seconds, (b) 3 minutes, and (c) 9 minutes. A careful review of these figures reveals the following: 1) a general trend of decreasing isotropic (dc) level as the dipping time increased, 2) a strong damping of the anisotropic oscillation amplitude compared to the untreated sample, and 3) 90 deg. phase change in the anisotropic contribution relative to the control (unetched) sample.

The four-fold phase-shifted modulation shown in FIGS. 4a–4c is consistent with dihydride termination with (1×1) reconstruction having a planar symmetry, as opposed to monohydride (2×1) or multi-hydride (e.g., 3×1) termination, consistent with the results given by Niwano, et. al, in *Journal of Applied Physics* 71, page 5646 (1992). Within experimental limits, no changes in the anisotropic signals were observed in the eight-peaked s-polarized emissions, thereby indicating that the bulk is unchanged.

Figure 5:
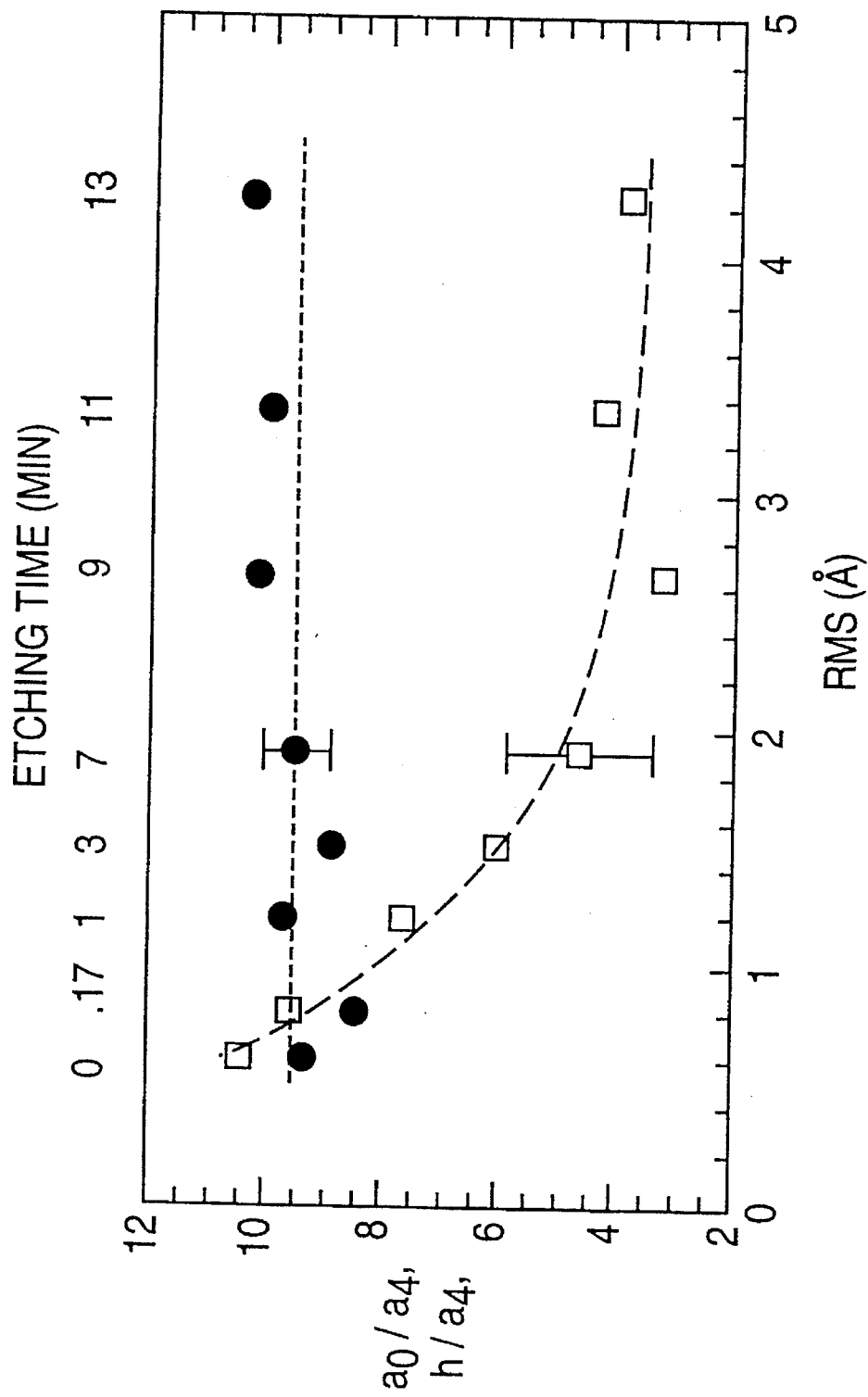
FIG. 5 is a plot of the behavior of two parameters that are used to approximate the p-p signal versus RMS roughness of a surface being measured.

To relate these SHG results quantitatively to microroughness, the same samples were characterized with Atomic Force Microscopy (AFM) after etching and SHG measurements, but before oxide regrowth. AFM images with a 512×512 pixel density over a 1 μm×1 μm section of the optically probed area of each of the BOE-treated samples are shown in the bottom panels of FIGS. 4a–4c. The images clearly show the increasing roughness of the H-terminated surfaces with increasing BOE exposure time. From these images, quantitative root-mean-square (RMS) roughness values, defined as:

$$RMS = \frac{\sqrt{\sum_{i=1}^{N} z_i^2}}{N},$$

where N is the number of sampling points, and where $z_i$ are the distances from the mean surface level, which are indicated in FIG. 5. Although surface features with different lateral scales may be present, the surface features that contribute to the roughness statistics reported here are approximately 500 Å circular asperities (approximately 10 times larger than the optical probe tip used and 20 times smaller than the total probed region) and are quite uniform in height and width. Multiple AFM scans in different sections of the optically probed region, and at different processing stages, confirmed reproducibility and uniformity of the RMS values to within ±0.3 Å.

After these measurements, the H-terminated samples were exposed for several days to a clean oxygen atmosphere to permit regrowth of the native oxide layer. Second harmonic measurements were then repeated. P-p configuration results are shown (open-circle data) in FIGS. 4a–4c. In addition, s-p configuration data are shown for the re-oxidized sample which was exposed to buffered oxide etch (BOE) for 10 seconds (filled triangles, FIG. 4a). These latter data clearly show a reversal to the original rotational oscillation phase, as expected for the oxidized surface, and a recovery of the original rotational oscillation amplitude. The p-p configuration data (open-circles) in FIGS. 4a–4c clearly demonstrates the sensitivity of second harmonic generation to Å-scale interface microroughness. Specifically, as RMS roughness increases from 0.6 Å to 4.3 Å, the p-p rotational oscillation amplitude and the isotropic level both decrease monotonically. A similar trend was observed in the s-p configuration. On the other hand, the s-polarized bulk (i.e., pure silicon, with no impurities) second harmonic remained unaffected by the surface BOE-treatment, as shown by the eight peaked p-s configuration data in the middle row panels of FIGS. 4a–4c.

To quantify the effect of the microroughness on SHG, the bulk p-s data (middle-row panels of FIGS. 4a–4c) were fitted to a functional form, $$I_{ps} = h'^2 + (a_4' * \sin(4\phi))^2, \quad (1)$$

where h' is used to account for a slight dc offset from the ideal functional form (i.e., h'=0), and $a_4'$ is proportional to the effective bulk quadrupole susceptibility. The solid curves in the middle-row panels of FIGS. 4a–4c show fits of the p-s data to Equation (1) and demonstrate that the values of $a_4'$ does not change within the experimental limits with increasing BOE exposure. This implies that the bulk is unchanged by the induced interfacial roughness. In addition, the value of h' remains virtually unchanged.

Theoretically, the p-p signal has the following functional form, $$I_{pp} = h'^2 + (a_0 + a_4 * \cos(4\phi))^2, \quad (2)$$

where $a_4 \approx 1.3 * a_4'$, and is related to $a_4'$ via the ratio of the effective Fresnel coefficients of the $Si/SiO_2$/air layer for p-polarized and s-polarized second harmonics, and thus remains a constant bulk quadrupole contribution. On the other hand, $a_0$ represents the electric dipole contribution from the $Si/SiO_2$ interface, which is sensitive to interface roughness, while h has been introduced to represent an additional isotropic, noninterfering contribution to the second harmonic signal (e.g., from the $SiO_2$ surface, strained interfacial regions, etc.). The solid curves through the p-p data (open-circles) in FIGS. 4a–4c represent a fit of this data to Equation (2). Curves showing fits of the s-p data to a similar equation are also shown for completeness. FIG. 5 is a plot of the behavior of $a_0$ and h, both normalized to $a_4$ as a function of the RMS roughness as derived from fits to p-p second harmonic data for eight samples with systematically prepared RMS roughness ranging from 0.6 Å to 4.3 Å. The value $a_0$ decreases approximately exponentially as a function of RMS. The long-dashed line in FIG. 5 shows a fit of the derived $a_4/a_0$ values to an exponential function of the form $[k_1 + k_2 * \exp(-RMS/L_0)]$, with an exponential decay constant $L_0 = 0.9$ Å. The exponential behavior is similar to previous SHG experiments during silicon homoepitaxy on Si(111) and Si(100) surfaces, where monotonically decreasing p-polarized signals as a function of growth were observed at room temperature, and were attributed to the growth of a partially disorder adlayer on an atomically smooth surface. Analogously, the observed behavior of the effective surface susceptibility $a_0$ is caused by Å-level microroughness at the Si/SiO interface. The quantity h has a constant fitted value throughout the RMS range, suggesting that it does not originate at the $Si/SiO_2$ interface. Nevertheless, since h is comparable with $a_0$, it must be taken into account in calculating the effective susceptibilities.

In another embodiment of the invention, photomodulated measurements are obtained from femtosecond pulses generated by a nonlinear optical device, such as an optical parametric oscillator (OPO). Preferably, the pulses should have sub-gap wavelengths (<1.1 μm). That way, these pulses will not themselves generate carriers, thus complicating data interpretation.

A readily available light source, such as a lamp or a synchronized, chopped train of above-gap wavelength (>1.1 μm) femtosecond light pulses will then provide controlled photomodulation. One advantage of using femtosecond photomodulation pulses is that significantly higher transient carrier densities can be generated at the arrival time of the infrared second harmonic generating pulses then with a lamp source, allowing for a saturated flat band condition and corresponding enhanced signal levels can thereby be obtained.

Ideally, the light source should be tunable over a particular wavelength range, for example, 0.8 μm to 1.0 μm, to vary the absorption depth, as is done in SPV. Then, the absorption depth dependence of the photomodulated SHG signal can be interpolated in terms of minority carrier diffusion length and surface recombination velocity, in close analogy to the analysis of SPV data. By tuning the sub-gap wavelength, this will allow the incident pulses to be optimized to the roughness characteristic of the interface being measured, thereby adding an important new dimension to the diagnostic capability of measuring sub-surface interface irregularities. In a still further embodiment, the reflected second harmonic beam is profiled with a Charged Coupled Device (CCD) camera, producing a nonspecular scattering of the second harmonic at the roughness interface. This use of the CCD camera will broaden the beam profile, thereby providing a complementary, interface-specific roughness diagnostic.

Figure 6A:
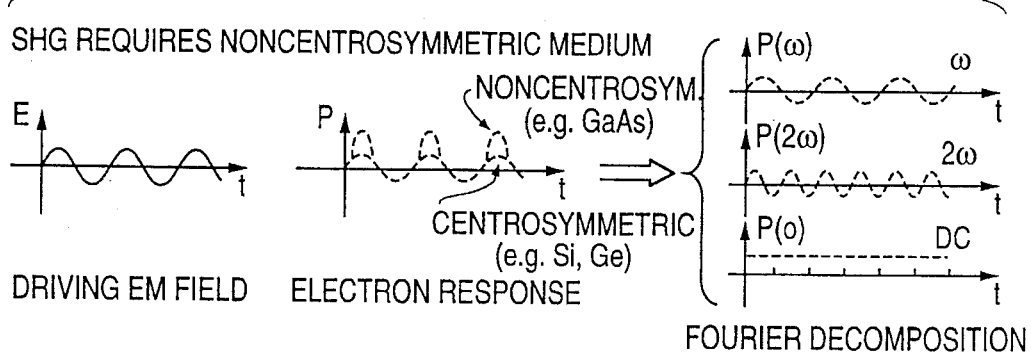
FIGS. 6a and 6b show the electron response and Fourier decomposition of the SHG signal on a particular surface type.
Figure 6B:
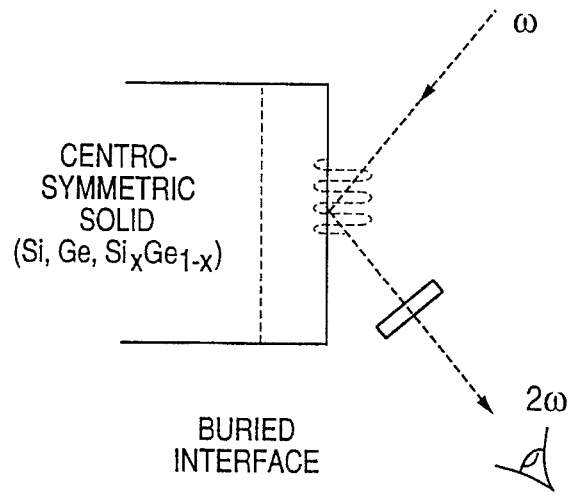
Figure 7A:
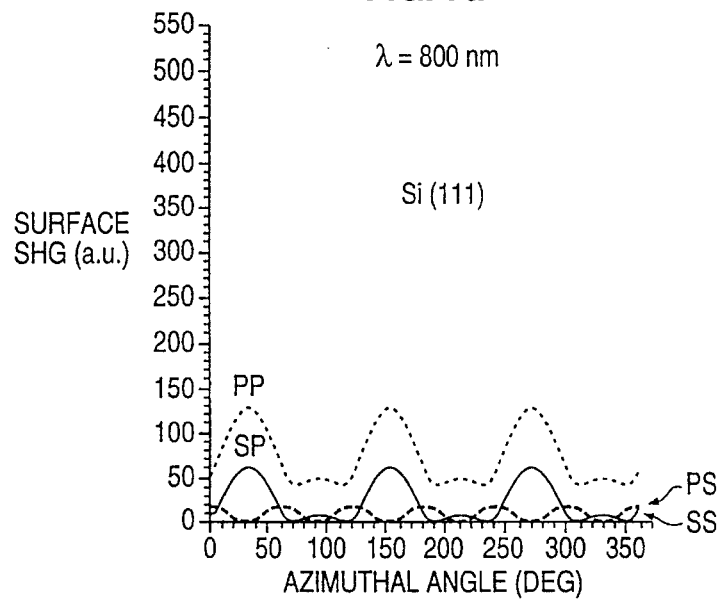
FIGS. 7a and 7b shows the experimental SHG response from Si(111) and Si(100) surfaces.
Figure 7B:
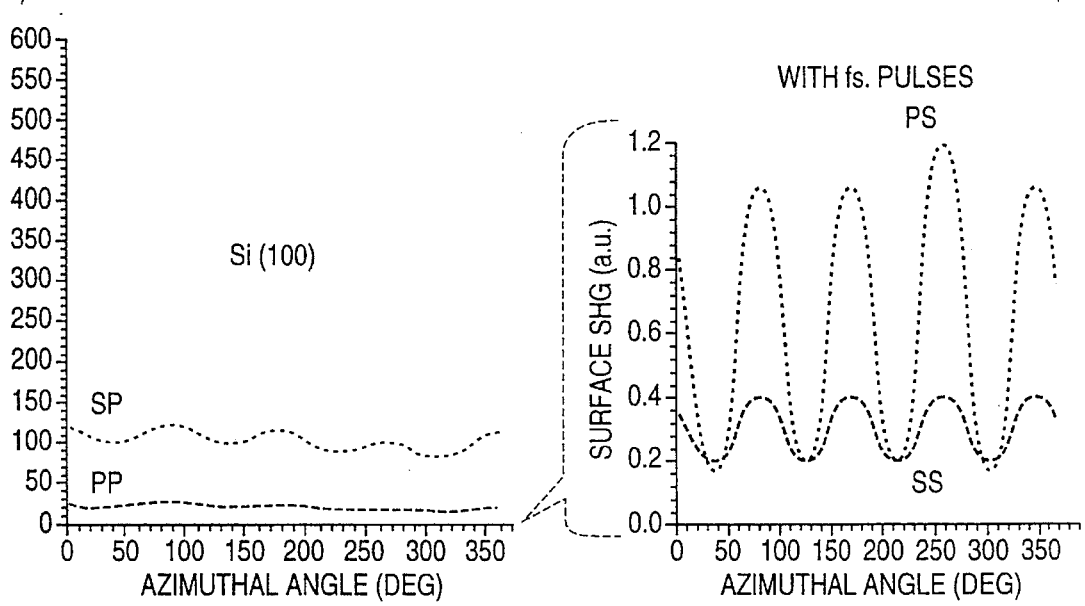

Further experiments performed on other semiconductor substrates, such as ZnSe and GaAs, have shown that femtosecond photomodulation can be performed on these devices as well to obtain angstrom-level microroughness, due to the strong non-linear properties of the depletion region. In fact, the interfacial roughness of any centrosymmetric device can be measured by the invention as described above. FIGS. 6a and 6b show the electron response and Fourier decomposition of the SHG signal due to reflections onto a centrosymmetric surface, such as Silicon, Germanium or a combination of these two elements. FIGS. 7a and 7b show experimental SHG responses from Si(111) and Si(100), respectively.

Thus, the angstrom-level interfacial roughness sensitivity of second harmonic generation using femtosecond lasers has been demonstrated to be both fast and accurate, and its utility and potential for non-contact, non-destructive probing of Si(100)/SiO$_2$ interfaces is highly compatible with ambient condition measurements. It has also been found that H-termination can significantly modify the second harmonic p-emissions relative to a Si(100)/SiO$_2$ surface without modifying the s-emission signals. This technique is also useful in measuring interfacial roughness of other types of Silicon/SiO$_2$ interfaces, such as Si(111)/SiO$_2$ and Si(001)/SiO$_2$. In fact, this technique can be used in measuring interfacial roughness of any type of centrosymmetric device, such as GaAs and ZnSe. Additionally, there has been shown the existence of an offset in the second harmonic signals, observed in both s- and p-emissions which can have a significant effect in calculating susceptibilities from the data.

Lastly, the invention allows for optimization of the characteristics of the femtosecond pulses that impinge on a particular surface for which the microroughness of that surface is to be measured. The parameters involved in this optimization are given in FIG. 8.

While preferred embodiments of the invention have been described, modification of the described embodiments may become apparent to those of ordinary skill in the art, following the teachings of the invention, without departing from the scope of the invention as set forth in the appended claims.

What is claimed is:

1. A method of determining physical properties of a surface to be studied, comprising the steps of:
   a) applying a plurality of light pulses from a laser light source to said surface, each of said light pulses having a pulsewidth in the femtosecond range;
   b) detecting a second harmonic frequency component for each of a plurality of light signals reflected from said surface, wherein said light signals correspond on a one-to-one basis to said plurality of light pulses from aid laser light source; and
   c) identifying variations in said surface due to changes in characteristics of said second harmonic frequency component for said each of said light signals,
   wherein step c) is performed by an averaging of said second harmonic frequency component for said each of said light signals reflected from said surface within a predetermined time.

2. The method as recited in claim 4, wherein each of said light pulses has a pulse width of about 120 femtoseconds.

3. The method as recited in claim 4, wherein said laser light source is a Ti:sapphire laser.

4. The method as recited in claim 1, wherein said surface is a surface of a semiconductor wafer, and wherein said method further comprises the step of scanning points on said wafer with said laser light source.

5. The method as recited in claim 1, further comprising the step of applying said plurality of light pulses from said laser light source at a peak power and repetition rate such that heating of said surface is less than a predetermined limit.

6. The method as recited in claim 1, wherein said surface is coated with a film, said method further comprising the step of transmitting said femtosecond light pulses through said film to said surface.

7. The method as recited in claim 1, wherein said variations in said surface include surface roughness, said method further comprising the step of determining said surface roughness from said second harmonic frequency components for said each of said light signals.

8. The method as recited in claim 1, wherein said variations in said surface include chemical variations, said method further comprising the step of identifying locations on said surface where chemical properties vary.

9. The method as recited in claim 1, wherein said each of said reflected light signals are transmitted through light filters, said light filters substantially blocking a fundamental and a third harmonic of said each of said reflected light signals and passing a detectable portion of said second harmonic of said each of said reflected light signals.

10. The method as recited in claim 1, wherein said light pulses are polarized to one of parallel (p-) polarization and perpendicular (s-) polarization.

11. The method as recited in claim 1, wherein said laser light source is an optical parametric oscillator.

12. The method as recited in claim 1, wherein said laser is tunable over a range of wavelengths.

13. The method as recited in claim 1, where in said predetermined time is about 0.2 seconds.

14. The method as recited in claim 1, further comprising the step of rotating said surface 360 degrees with respect to said laser light source.

15. The method as recited in claim 4, further comprising the step of averaging said second harmonic frequency component of said each of said light signals reflected from said semiconductor wafer within a predetermined time for each of said points.

16. The method as recited in claim 5, wherein said surface is a semiconductor surface and said predetermined limit is about 5K.

17. The method as recited in claim 11, wherein said light pulses from said optical parametric oscillator have a wavelength of less than 1.1 microns.

18. The method as recited in claim 12, wherein said range of wavelengths is between 0.8 microns and 1.0 microns.

19. The method as recited in claim 14, further comprising the step of providing an indication of said variations in said surface characteristics for locations in said wafer.

20. The method as recited in claim 16, wherein said light pulses have a peak power of about 100 kW and a repetition rate of about 100 MHz.

21. The method as recited in claim 20, wherein said light pulses have an energy below about $10^{-8}$ J.

22. A method of determining physical properties of a surface to be studied, comprising the steps of:
   a) applying a plurality of light pulses from a laser light source to said surface, each of said light pulses having a pulsewidth in the femtosecond range;
   b) detecting a second harmonic frequency component for each of a plurality of light signals reflected from said surface, wherein said light signals correspond on a one-to-one basis to said plurality of light pulses from said laser light source; and
   c) identifying variations in said surface due to changes in characteristics of said second harmonic frequency component for said each of said light signals;
   d) storing said variations in said surface corresponding to characteristics of said second harmonic in a memory; and
   e) comparing said changes in characteristics of said second harmonic to said variations stored in said memory to identify one of said physical properties.

23. A method of determining physical properties of a surface to be studied, comprising the steps of:

a) applying a plurality of light pulses from a laser light source to said surface, each of said light pulses having a pulsewidth in the femtosecond range;

b) detecting a second harmonic frequency component for each of a plurality of light signals reflected from said surface, wherein said light signals correspond on a one-to-one basis to said plurality of light pulses from said laser light source; and c) identifying variations in said surface due to changes in characteristics of said second harmonic frequency component for said each of said light signals, wherein said Light pulses are polarized to one of parallel (p-) polarization and perpendicular (s-) polarization, and wherein said each of said light signals reflected from said semiconductor surface are counted at a first rate for pulses having said p-polarization and at a second rate for pulses having said s-polarization.

24. A method of determining physical properties of a semiconductor surface, wherein said semiconductor surface is a surface of a wafer, said method comprising the steps of:

a) applying a plurality of light pulses to said semiconductor surface from a Ti:Sapphire laser source wherein each of said light pulses having a pulse width of about 120 femtoseconds;

b) receiving a plurality of light pulses reflected from said semiconductor surface into optical filters, wherein said optical filters substantially block a fundamental and a third harmonic and pass a detectable portion of a second harmonic signal of said light pulses reflected from said semiconductor surface;

c) receiving said second harmonic frequency into an analyzer, wherein said analyzer detects variations in said second harmonic signal and relating said variations to physical properties of said surface;

d) scanning a plurality of locations on said wafer with said laser source, and at each of said locations receiving said light pulses reflected from said surface for a predetermined time; and e) averaging amplitudes of said light pulses reflected from said surface for said predetermined time at each of said locations.

25. The method as recited in claim 24, wherein said semiconductor surface is covered by a film and said plurality of light pulses pass through said film to said semiconductor surface.

26. The method as recited in claim 24, further comprising the step of changing a relative position of said wafer with respect to said light source, wherein said relative position is changed from a range of 0 degrees to 360 degrees.

27. The method as recited in claim 26, further comprising the step of applying said light pulses at a peak power and repetition rate to limit heating of said semiconductor surface by said light pulses to a predetermined value.

28. A method of determining physical properties of a semiconductor surface, said method comprising the steps of:

a) applying a plurality of light pulses to said semiconductor surface from a Ti:Sapphire laser source, wherein each of said light pulses having a pulse width of about 120 femtoseconds;

b) receiving a plurality of light pulses reflected from said semiconductor surface into optical filters, wherein said optical filters substantially block a fundamental and a third harmonic and pass a detectable portion of a second harmonic signal of said light pulses reflected from said semiconductor surface;

c) receiving said second harmonic frequency into an analyzer, wherein said analyzer detects variations in said second harmonic signal and relating said variations to physical properties of said surface;

d) storing data representing variations of a surface similar to said semiconductor surface; and e) comparing said variations in said second harmonic signal to said variations stored in said memory to identify one of said physical properties.

29. An apparatus for analyzing a semiconductor surface, said apparatus comprising:

a laser source transmitting light pulses to said semiconductor surface, said light pulses having a pulse width of less than 200 femtoseconds;

an analyzer detecting a second harmonic frequency component of light pulses reflected from said semiconductor surface, said analyzer identifying variations in physical characteristics of said semiconductor surface from changes in said second harmonic frequency component, wherein said analyzer averages said plurality of light pulses reflected from said surface for a predetermined time.

30. The apparatus as recited in claim 29, wherein said pulse width is about 120 femtoseconds.

31. The apparatus as recited in claim 29, wherein said laser source is a Ti:Sapphire laser.

32. The apparatus as recited in claim 29, wherein said predetermined time is about 0.2 seconds.

33. The apparatus as recited in claim 29, further comprising a scanner operable to scan said laser source over a plurality of locations on a surface of a semiconductor wafer.

34. The apparatus as recited in claim 29, wherein said laser source transmits light pulses at a power level and a repetition rate such that heating of semiconductor surface due to said light pulses hitting said semiconductor surface is below a predetermined limit.

35. The apparatus as recited in claim 33, further comprising means for rotating said wafer with respect to said laser source over a 0 degree to 360 degree range.

36. The apparatus as recited in claim 34, wherein said predetermined limit is about 5K.

37. The apparatus as recited in claim 34, wherein said light pulses have a peak power of about 100 kW and a repetition rate of about 100 MHz.

38. The apparatus as recited in claim 34, wherein said light pulses have an energy output below $10^{-8}$ J.

39. An apparatus for analyzing a semiconductor surface, said apparatus comprising:

a laser source transmitting light pulses to said semiconductor surface, said light pulses having a pulse width of less than 200 femtoseconds;

an analyzer detecting a second harmonic frequency component of light pulses reflected from said semiconductor surface, said analyzer identifying variations in physical characteristics of said semiconductor surface from changes in said second harmonic frequency component;

a scanner operable to scan said laser source over a plurality of locations on a surface of a semiconductor wafer, wherein said analyzer averages a plurality of pulses reflected at each of said locations for a predetermined time.

40. The apparatus as recited in claim 39, wherein said predetermined time is about 0.2 seconds.

* * * * *